(12) United States Patent
Fisher et al.

(10) Patent No.: US 7,188,420 B2
(45) Date of Patent: Mar. 13, 2007

(54) METHOD FOR MANUFACTURING BEVEL GEARS

(75) Inventors: James Steven Fisher, Huntertown, IN (US); Trevor O'Bryan McKinney, Fort Wayne, IN (US)

(73) Assignee: Torque—Traction Technologies, Inc., Maumee, OH (US)

( * ) Notice: Subject to any disclaimer, the term of this patent is extended or adjusted under 35 U.S.C. 154(b) by 469 days.

(21) Appl. No.: 10/799,702

(22) Filed: Mar. 15, 2004

(65) Prior Publication Data

US 2005/0198808 A1    Sep. 15, 2005

(51) Int. Cl.
- B23P 23/00 (2006.01)
- B23F 1/06 (2006.01)
- B23F 21/22 (2006.01)
- B23F 23/06 (2006.01)

(52) U.S. Cl. ............ 29/893.35; 29/558; 279/136; 409/26; 409/27; 409/12; 409/51; 409/13; 409/61; 409/62; 409/900.1; 82/170

(58) Field of Classification Search .......... 29/557–558, 29/893.35, 893.3, 893.36; 279/136; 409/900.1, 409/62, 12, 11, 26, 25, 51, 50, 27–30, 61, 409/13; 407/23, 21, 22, 25, 28–29, 20, 113; 82/170, 150–151, 162, 164; 33/613, 644–645
See application file for complete search history.

(56) References Cited

U.S. PATENT DOCUMENTS

| | | | |
|---|---|---|---|
| 2,417,409 A | 3/1947 | Garrison et al. | |
| 2,865,643 A | 12/1958 | Parker et al. | |
| 2,879,070 A | * | 3/1959 | Garrison et al. ............ 279/136 |
| 3,108,412 A | 10/1963 | Benjamin et al. | |
| 3,176,997 A | 4/1965 | Parker et al. | |
| 3,368,455 A | 2/1968 | Ellwanger | |
| 3,508,462 A | 4/1970 | Wildhaber | |
| 3,541,921 A | 11/1970 | Helfer et al. | |
| 3,554,079 A | 1/1971 | Hunkeler et al. | |
| 3,635,323 A | 1/1972 | Helfer et al. | |
| 3,822,631 A | 7/1974 | Bauknecht et al. | |
| 3,915,060 A | * | 10/1975 | Koga ..................... 409/53 |
| 4,045,987 A | 9/1977 | Gabriele | |

(Continued)

FOREIGN PATENT DOCUMENTS

EP    0 813 927 A2    12/1997
GB    1065095    4/1967

Primary Examiner—Erica Cadugan
(74) Attorney, Agent, or Firm—Berenato, White & Stavish LLC

(57) ABSTRACT

A method for manufacturing a bevel gear member, comprises the steps of providing a bevel gear blank having a gearhead, forming gear teeth on the gearhead of the bevel gear blank by simultaneously cutting gear tooth top land, gear tooth side profile and a bottom land to form an unfinished bevel gear member using a face hobbing process, and machining at least one selected surface of the unfinished bevel gear member using the top lands of said gear teeth as a datum for centering the unfinished bevel gear member, thus forming a finished product. The method is applicable for manufacturing the bevel gear member both with shaft axially extending from the gearhead and without the shaft. The bevel gear members manufactured with this method exhibit reduced runout and require simpler, less expensive tooling.

11 Claims, 9 Drawing Sheets

U.S. PATENT DOCUMENTS

| | | |
|---|---|---|
| 5,116,173 A | 5/1992 | Goldrich |
| 5,123,786 A * | 6/1992 | Yates et al. .................... 407/25 |
| 5,135,810 A | 8/1992 | Smith et al. |
| 5,251,510 A | 10/1993 | Trim et al. |
| 5,292,212 A | 3/1994 | Taylor et al. |
| 5,374,142 A * | 12/1994 | Masseth ...................... 407/23 |
| 5,527,400 A | 6/1996 | Smith et al. |
| 5,662,438 A | 9/1997 | Wiener et al. |
| 5,716,174 A | 2/1998 | Stadtfeld et al. |
| 5,800,103 A | 9/1998 | Stadtfeld et al. |
| 5,946,963 A | 9/1999 | Suzuki et al. |
| 6,079,090 A | 6/2000 | Ongaro |
| 6,260,855 B1 | 7/2001 | Curtis |
| 6,536,999 B1 | 3/2003 | Bradfield et al. |
| 6,739,064 B1 * | 5/2004 | Smith .......................... 33/613 |
| 2003/0049084 A1 | 3/2003 | Bradfield et al. |

\* cited by examiner

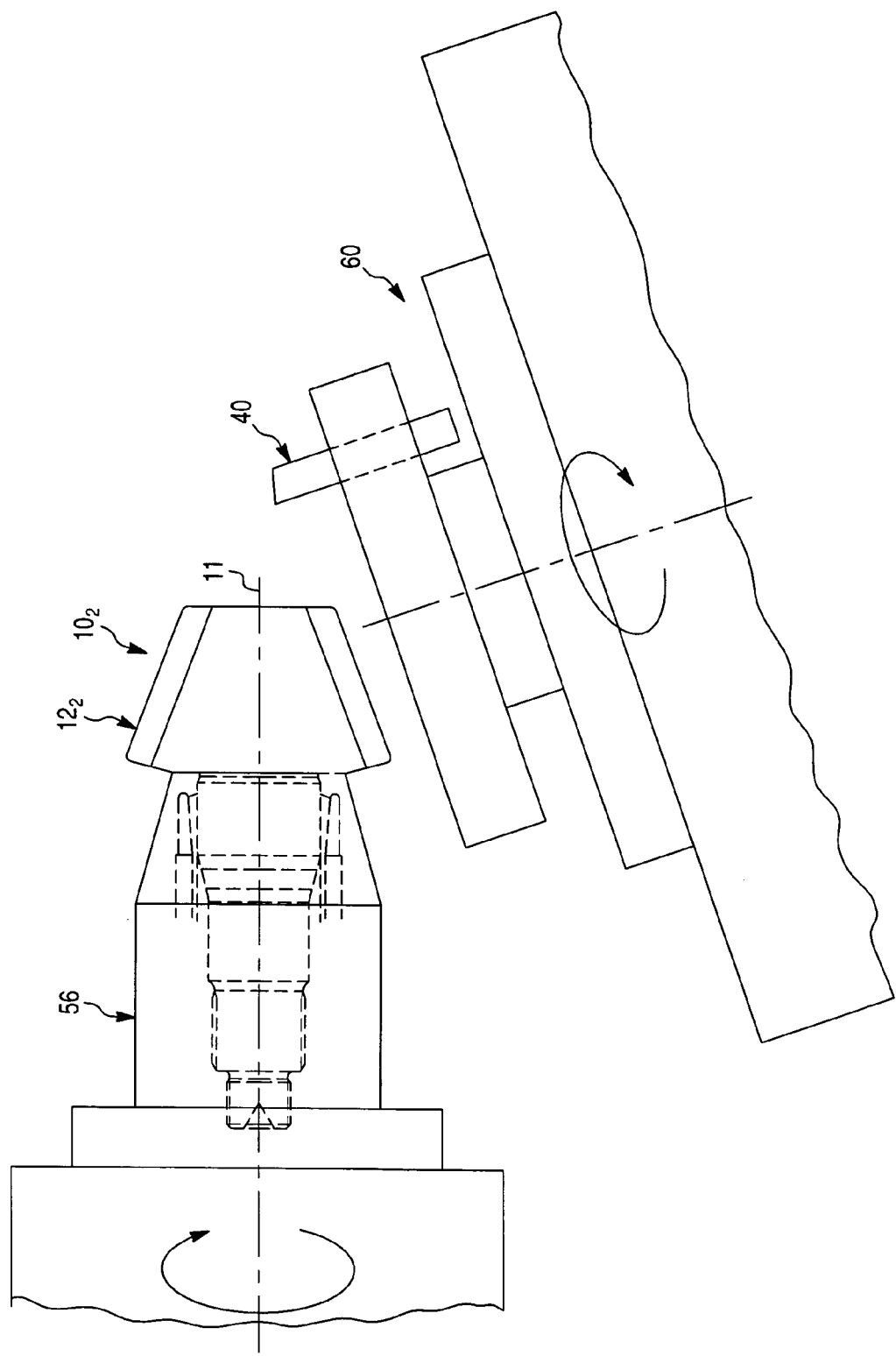

METHOD FOR MANUFACTURING BEVEL GEARS

BACKGROUND OF THE INVENTION

1. Field of the Invention

The invention relates to methods for manufacturing toothed gears and, more particularly, to a method for manufacturing bevel gears with reduced runout by using the gear tooth top lands as a datum.

2. Background of the Invention

The traditional methods for manufacturing bevel gears with shafts involves several steps. First, a rough forging or bar stock would be machined into a blank which would include center bores used as manufacturing location points, or datums. The blank could include threads or splines as needed, or threads or splines could be added at a later operation. After blanking, the gear teeth are cut into the workpiece.

Spiral bevel and hypoid gear pairs are conventionally produced utilizing either an intermittent index face milling method or a continuous indexing face hobbing method. Until recently, face milling of gear teeth was the preferred method. The face hobbing process has been recently adopted by some gear manufacturers, especially those gear manufacturers who make the spiral bevel and hypoid gear sets for vehicular applications. In a face hobbing machine, a circular face hob type rotary cutter carrying a plurality of cutter blades mounted in groups, is utilized, and a workpiece (gear blank) and the cutter continuously rotate in a timed relationship until the entire part is completed. During the cutting process, the workpiece indexes in a rotary manner so that each successive cutter blade groups engaging successive tooth slots as the gear or pinion member is being cut. The face hobbing method requires fewer production steps and less production time than the face milling method.

Normally, the tooth top lands of the gear teeth are not machined at the same time as the gear tooth profiles are cut, which incurs a great deal of eccentricity between a gear teeth pitch line and the top land. Surfaces such as centers had to be added to the gears, or expensive and complicated equipment such as gear pitch line chucks had to be purchased and maintained for machining the gears.

Thus, there is a need for an improved method for manufacturing bevel gears that overcomes shortcomings of the conventional independent drive axles.

SUMMARY OF THE INVENTION

The present invention provides a novel method for manufacturing bevel gears. The method in accordance with the present invention comprises the steps of providing a bevel gear blank having a gearhead, forming gear teeth on the gearhead of the bevel gear blank by simultaneously cutting gear tooth top land, gear tooth side profile and a bottom land to form an unfinished bevel gear member using a face hobbing process, and machining at least one selected surface of the unfinished bevel gear member using the top lands of the gear teeth as a datum for centering the unfinished bevel gear member, thus forming a finished product. The method is applicable for manufacturing the bevel gear member both with shaft axially extending from the gearhead and without the shaft.

Therefore, the present invention represents a novel arrangement of the method for manufacturing bevel gears. Forming gear teeth by simultaneously cutting gear tooth top land, gear tooth side profile and a bottom land to form an unfinished bevel gear member provides virtually no eccentricity between the gear tooth top lands and the gear bottom lands, and machining at least one selected surface of the unfinished bevel gear member using the top lands of the gear teeth as a datum for centering the unfinished bevel gear member. As a result, the bevel gear members manufactured in accordance with the present invention exhibit substantially reduced runout with a simpler set-up, require simpler, less expensive tooling to machine the gear members, which is easier to keep aligned for eccentricity and much easier to maintain. The runout can be set so as to reduce vehicle noise levels.

Moreover, cutting the gear tooth top land simultaneously with the gear tooth side profile eliminates of a subsequent manufacturing operation improves the consistency and accuracy of a gear teeth pith line runout, and part quality, as well as reduces manufacturing costs. In addition, the gear cutter blade of the present invention allows for greater manufacturing flexibility, as the cutting edge dimensions can be easily modified, and provides an ability to machine near-net forged parts without requiring precision control of the tooth top land during a blanking operation.

BRIEF DESCRIPTION OF THE DRAWINGS

Other objects and advantages of the invention will become apparent from a study of the following specification when viewed in light of the accompanying drawings, wherein:

FIG. 6 is a simplified sectional view of showing a gear tooth cutting operation performed on a face hobbing machine in accordance with the preferred embodiment of the present invention;

DETAILED DESCRIPTION OF PREFERRED EMBODIMENTS

The preferred embodiment of the present invention will now be described with the reference to accompanying drawings.

The present invention is related to a method for manufacturing bevel gears. The preferred embodiment of the present invention describes a process for manufacturing a bevel gear member having a shaft adapted to support the gear member within a gear casing, such as a hypoid and/or spiral pinion drive gear member used for final drive assemblies of vehicular drive axles. It will be appreciated that the method for manufacturing bevel gears of the preferred embodiment of the present invention may be used for manufacturing of any bevel gear member including a gearhead with any appropriate tooth profile, such as spiral, hypoid, straight, etc., and a shaft. For the purpose of this application, the term "gearhead" will encompass a portion of a workpiece, gear blank or gear member provided or adapted to be provided with gear teeth.

The method for manufacturing bevel gears with shafts in accordance with the preferred embodiment of the present invention involves several steps.

Figure 1:
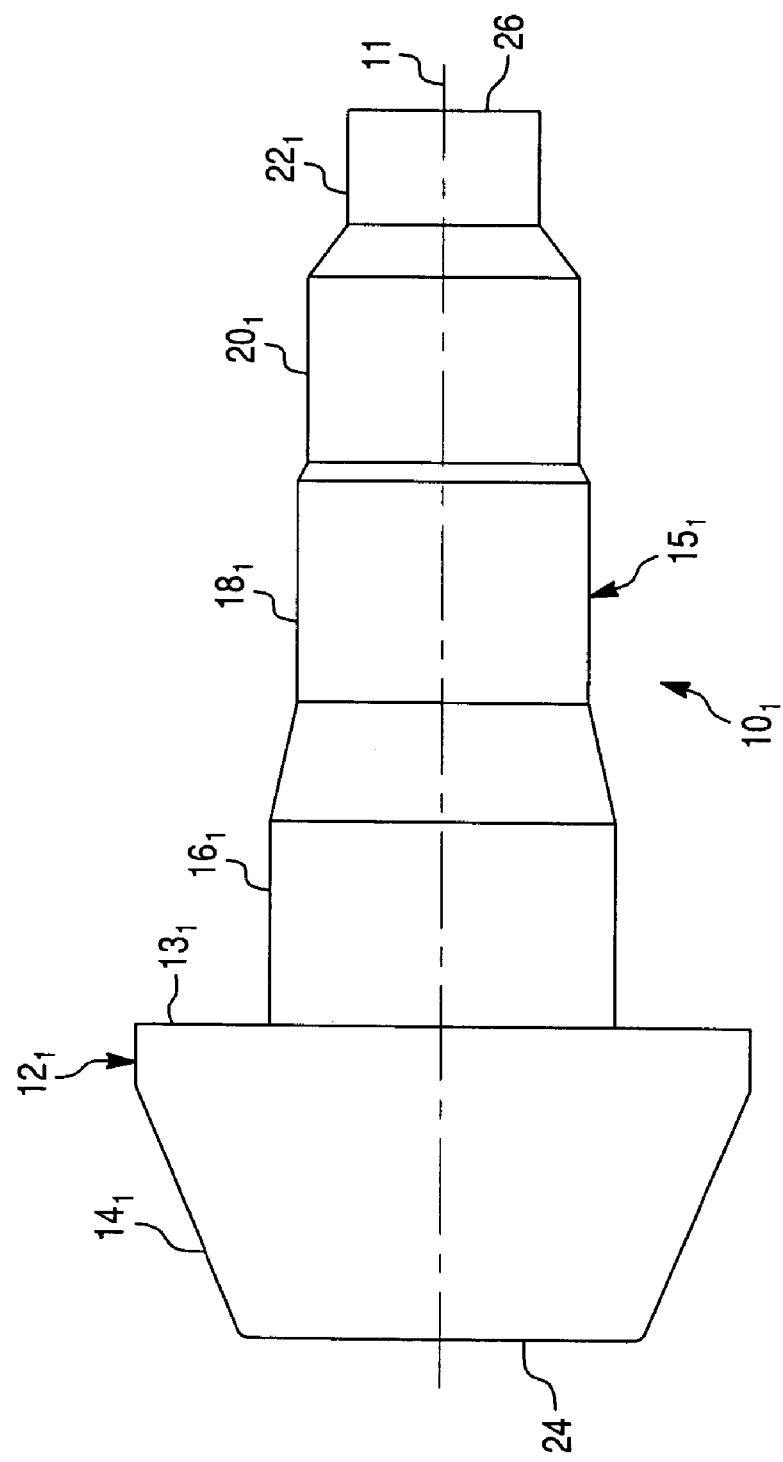
FIG. 1 is a side view of a workpiece in accordance with the preferred embodiment of the present invention.

First, a rough workpiece $10_1$ illustrated in FIG. 1, is formed by forging, casting or any other appropriate manner known in the art. Preferably, the workpiece $10_1$ is a unitary, single-piece metal part made, preferably, by forging. The workpiece $10_1$ has a gearhead $12_1$ and a shaft $15_1$ coaxially extending from the gearhead $12_1$. The workpiece $10_1$ has a centerline 11 extending between a front end 24 and a rear end 26. The shaft $15_1$ of the workpiece $10_1$ is further provided with a first bearing seat portion $16_1$, a second bearing seat portion $18_1$, a rear portion $20_1$ and a tail portion $22_1$ of varying diameters. The gearhead $12_1$ of the workpiece $10_1$ has a face angle surface $14_1$ and a rear face surface $13_1$.

Figure 2:
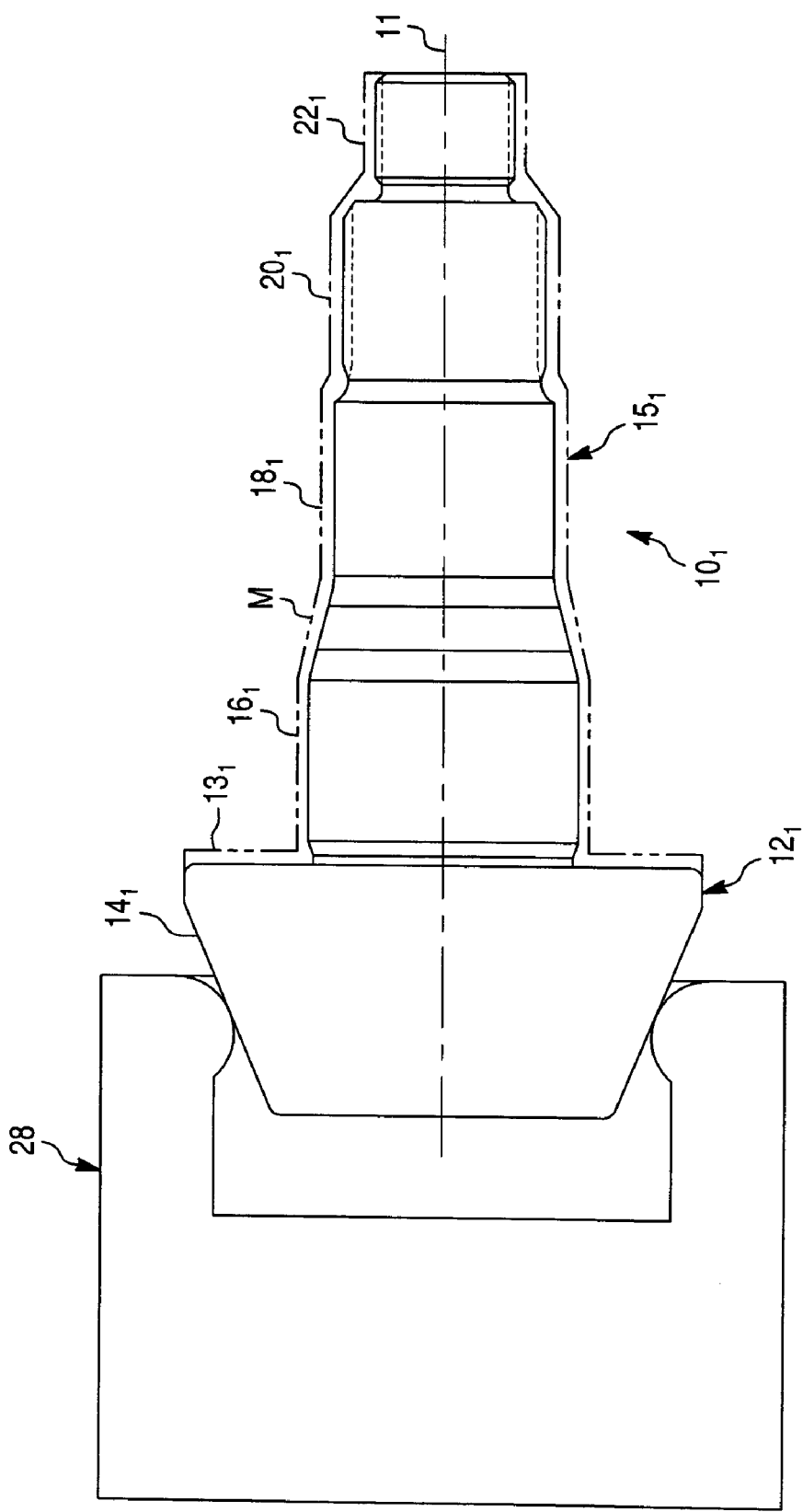
FIG. 2 is a side view of the workpiece in accordance with the preferred embodiment of the present invention supported by a centering ring.

As illustrated in FIG. 2, the workpiece $10_1$ is then machined while supported by a centering ring (or locator) 28 engaging the face angle surface $14_1$ of the gearhead $12_1$ of the workpiece $10_1$. During the machining operation, excess material is removed from the shaft $15_1$ and the rear face surface $13_1$ of the gearhead $12_1$ of the workpiece $10_1$, thus forming a unitary gear blank $10_2$ shown in FIG. 3, ready for tooth cutting operation. The excess material removed during the machining operation is shown in phantom line in FIG. 2 and is generally designated by the reference numeral M.

Figure 3:
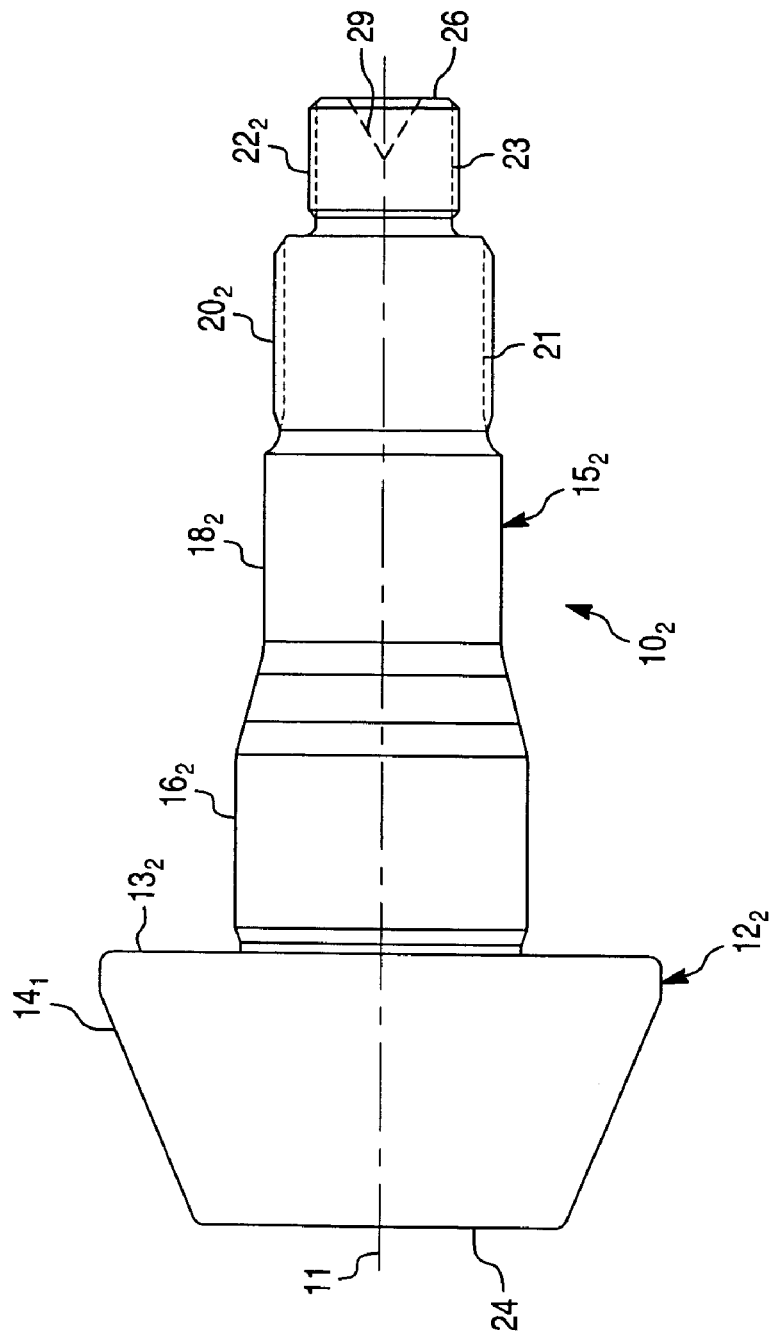
FIG. 3 is a side view of a unitary gear blank in accordance with the preferred embodiment of the present invention.

As illustrated in FIG. 3, the unitary gear blank $10_2$ has a gearhead $12_2$ and a machined shaft $15_2$ coaxially extending from the gearhead $12_2$. The shaft $15_2$ of the gear blank $10_2$ is further provided with a first bearing seat portion $16_2$, a second bearing seat portion $18_2$, a rear portion $20_2$ and a tail portion $22_2$ of varying diameters. It will be appreciated that the rear portion $20_2$ of the gear blank $10_2$ may include splines 21, while the tail portion $22_2$ may have threads 23, formed as needed during the previous step of forming the unitary gear blank $10_2$. Alternatively, the splines 21 and/or threads 23 could be added at a later operation. The unitary gear blank $10_2$ also includes a rear center bore 29 formed at the rear end 26 thereof used as manufacturing location points, or datums. The rear center bore 29 is provided to receive a centering pin 52 of a rear spindle 50 (shown in FIG. 7) to fully support the gear blank 10 on a machine tool. The gearhead $12_2$ of the unitary gear blank $10_2$ has the face angle surface $14_1$ and a machined rear face surface $13_2$.

Figure 4:
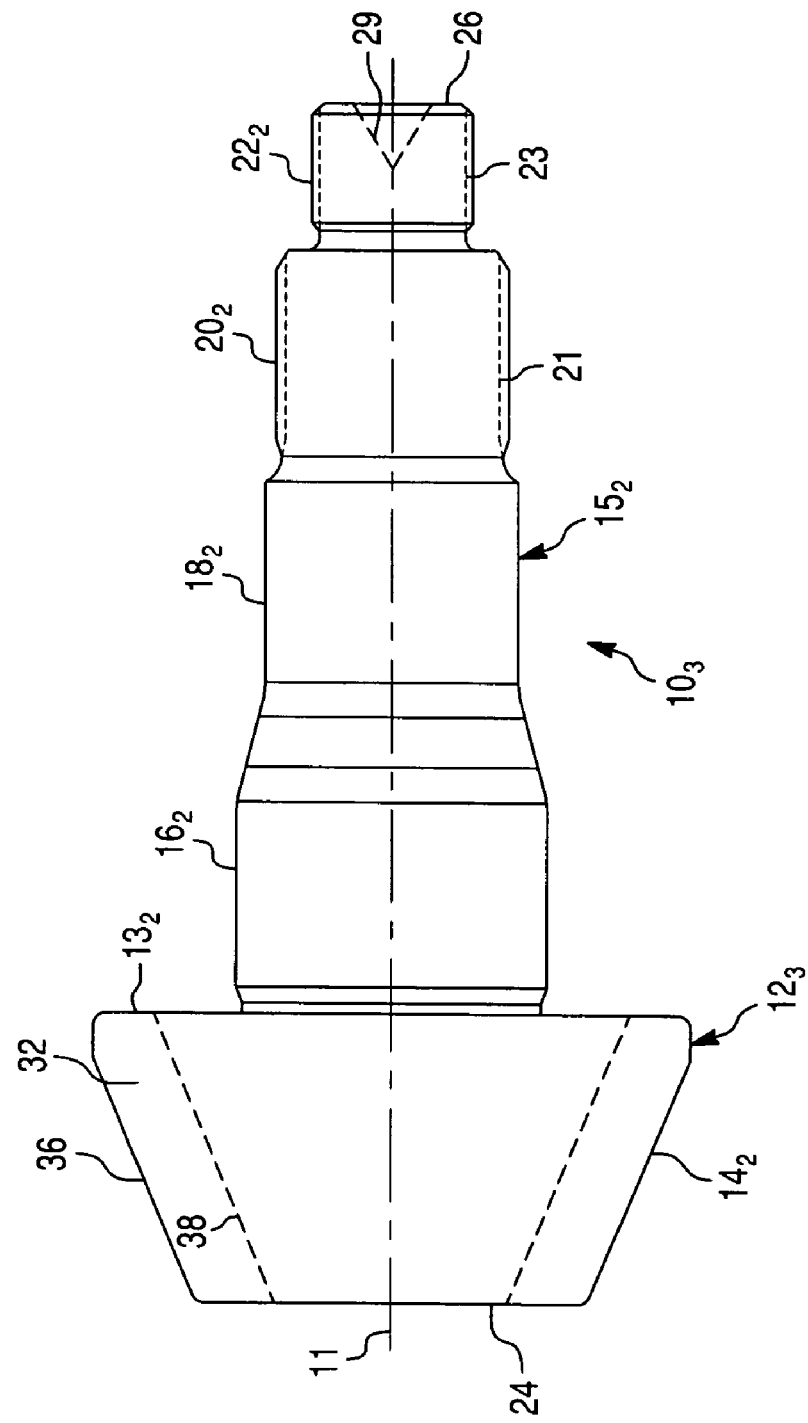
FIG. 4 is a side view of an unfinished bevel gear member in accordance with the preferred embodiment of the present invention.
Figure 5A:
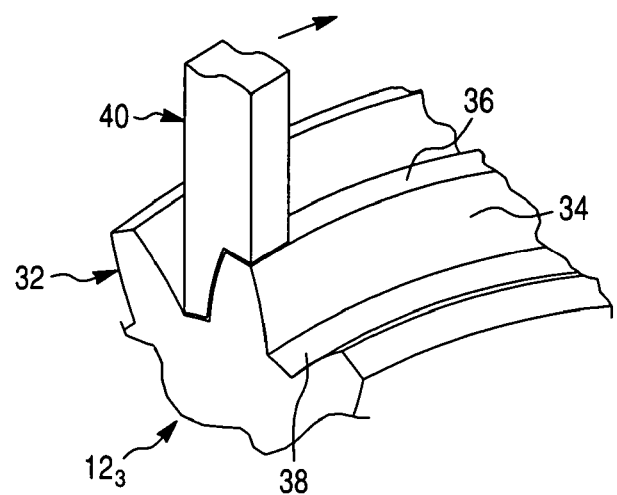
FIG. 5A is a partial perspective view of a gearhead of the unitary gear blank on which a cutter blade is operating in accordance with the present invention.

After blanking operation, a plurality of gear teeth 32 are cut into the gear blank $10_2$ in order to form an unfinished bevel gear member $10_3$ of the present invention illustrated in FIG. 4. As shown, each gear tooth 32 includes pair of opposite side profiles 34 a top land 36. The gear teeth 32 are separated by a bottom land 38. As further illustrated in FIG. 5, the gear teeth 32 are cut with gear cutter blades 40 (only one is shown in FIG. 5A) provided to cut the top land 36 of the gear tooth 32 simultaneously with the side profile 34 thereof and bottom land 38. Such a method is disclosed in U.S. Pat. No. 6,536,999 which is assigned to the assignee of the present application and is hereby incorporated by reference into the present application.

Figure 5B:
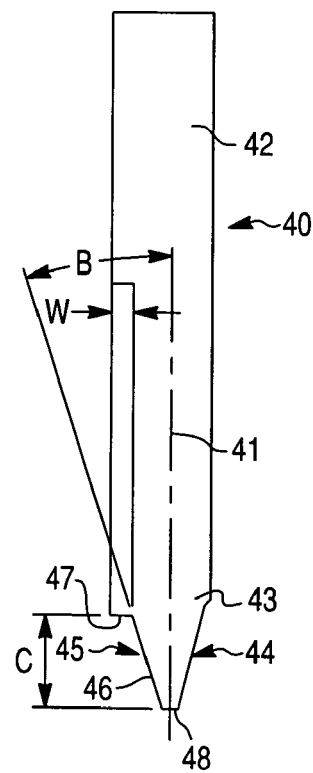
FIG. 5B is a view of the cutter blade of FIG. 5A illustrating geometry of a cutting edge thereof.

As illustrated in FIG. 5B, the cutter blade 40 includes a shank 42 and a cutting member 44 formed at a distal end 43 thereof A front face of the cutting member 44 of the cutter blade 40 is provided, generally only on one side thereof, with a cutting edge 45. The cutting edge 45 comprises a first section 46 for cutting the side profile 34 of the gear tooth 32, and a second section 47 for cutting the top land 36 of the gear tooth 32. Thus, the first section 46 defines a tooth side profile cutting edge and the second section 47 defines a tooth top land cutting edge.

The first section 46 of the cutting edge 45 extends from a tip 48 of the cutting member 44 at a predetermined axial pressure angle B. The axial pressure angle B of the first section 46 of the cutting edge 45 obviously depends on the angle desired for the sides of the gear teeth. As used herein, "axial pressure angle" is defined as the angle between the first section 46 of the cutting edge 45 and a central axis 41 of the cutter blade 40. The second section 47 of the cutting edge 45 is characterized by a width W, as illustrated in FIG. 5C. A distance C from the tip 48 of the cutting member 44 to an intersection of the first section 46 and the second section 47 of the cutting edge 45 is a height of the first section 46 of the cutting edge 45 of the cutting member 44. The distance C is substantially equal to a whole depth of the gear tooth 32.

Thus, the gear cutter blade 40 cuts the side profile 34 of the gear tooth 32 by means of the first section 46 of the cutting edge 45, and simultaneously forms at least a substantial portion of the tooth top land 36 of the gear tooth 32 by means of the second section 47 of the cutting edge 45. The second section 47 of the cutting edge 45 may dimensioned to cut an entire tooth top land 36 of the gear tooth 32, as illustrated in FIGS. 5A and 5B.

Cutting the gear tooth top land simultaneously with the gear tooth side profile eliminates of a subsequent manufacturing operation improves the consistency and accuracy of a gear tooth whole depth, and part quality, as well as reduces manufacturing costs. In addition, the gear cutter blade of the present invention allows for greater manufacturing flexibility, as the cutting edge dimensions can be easily modified, and provides an ability to machine near-net forged parts without requiring precision control of the tooth top land during a blanking operation.

Preferably, as illustrated in FIG. 6, during the gear teeth cutting operation, the shaft $15_2$ of the gear blank $10_2$ is held by a collect chuck 56 and the gear teeth 32 are cut by a face hobbing process on a face hobbing machine 60.

During the teeth cutting operation, illustrated in FIG. 6, excess material is removed from the face angle surface $14_1$ of the gearhead $12_2$ of the gear blank $10_2$, thus forming the unfinished bevel gear member $10_3$ shown in FIG. 4, including a gearhead $12_3$ having a plurality of gear teeth 32. It will be appreciated that any appropriate tooth profile may be formed during the teeth cutting operation, such as spiral, hypoid, straight, etc.

One of ordinary skill in the art will appreciate that a face angle surface $14_2$ of the gearhead $12_3$ of the bevel gear member $10_3$, shown in FIG. 4, is defined by the tooth top lands 36 of the gear teeth 32. Furthermore, since the gear tooth top lands 36 are machined at the same machine and by the same cutter blade as the gear tooth side profiles 34, the tooth top lands 36 and bottom lands 38 are extremely concentric. Thus, the top lands 36 of the gear teeth 32 (or the face angle surface $14_2$ of the gearhead $12_3$) may be employed as a manufacturing datum and/or manufacturing locating surface at subsequent machining operations. In other words, the top lands 36 of the gear teeth 32 cut during the above manufacturing step are extremely concentric with a pitch of the gear teeth 32 so that any runout in the centering ring (or locator) 28 which rests on the top lands 36 of the gear teeth 32 will place precisely that amount of runout into the pitch of the gear teeth when measured from the centerline 11 of the regardless of the runout induced by other operations. The locating surface in the form of the top lands 36 of the gear teeth 32 (or the face angle surface 14₂) can be easily checked for runout and wear using a standard indicator gage.

The next step after the gear teeth cutting operation is to heat treat the unfinished gear member 10₃ using various common heat treatment methods. The hardened by the heat treatment gear teeth 32 are stronger and wear better than soft gear teeth. The shaft 15₂ has better torsional strength after the hardening operation. Typically after heat treatment, hypoid and spiral bevel gears with shafts are straightened if necessary.

Figure 7:
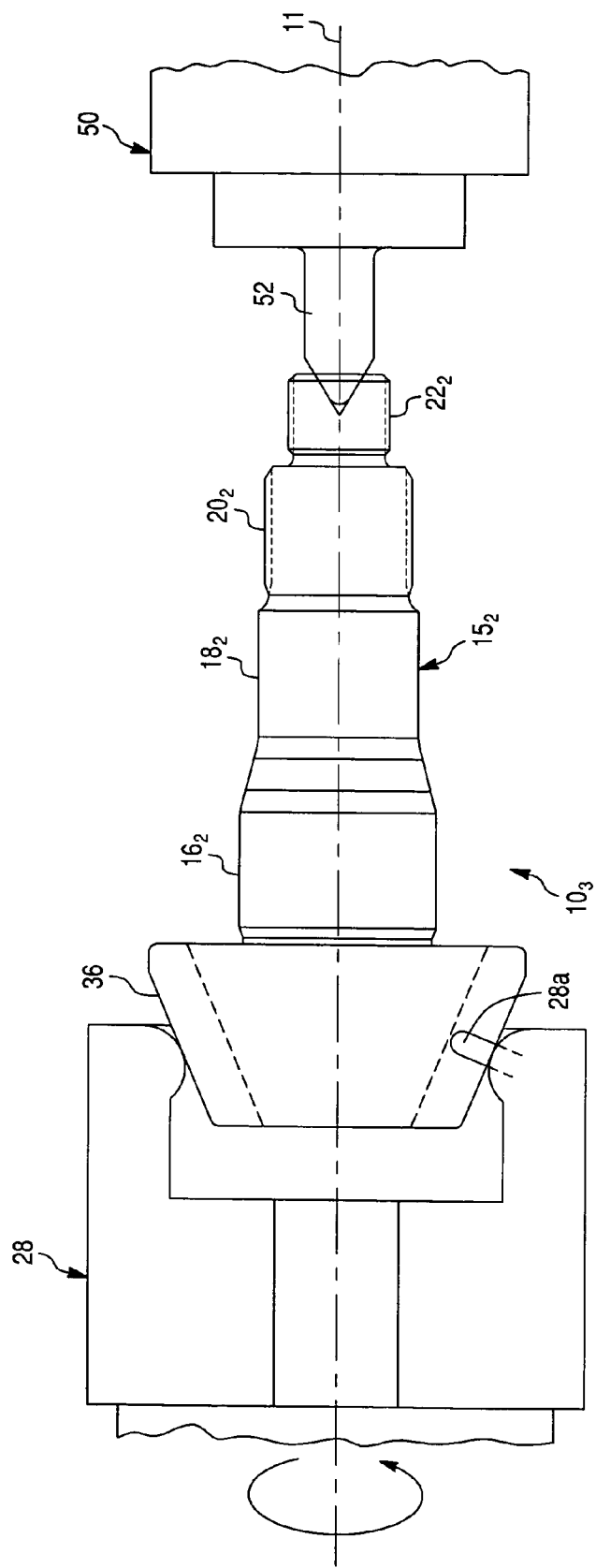
FIG. 7 is a side view of the unfinished bevel gear member supported by the centering ring and a rear spindle during a finish machining operation in accordance with the preferred embodiment of the present invention.

Lastly, a final machining operation or operations where the bearing seat portion 16₂ and 18₂ of the unfinished bevel gear member 10₃ are finish machined. During the final machining operation, as illustrated in FIG. 7, the unfinished bevel gear member 10₃ is supported by the centering ring (or locator) 28 which rests on the top lands 36 of the gear teeth 32 (or the face angle surface 14₂) of the gearhead 12₃ and the centering pin 52 of the rear spindle 50 engaging the rear center bore 29 in the rear end 26 of the unfinished bevel gear member 10₃. The unfinished bevel gear member 10₃ is driven by the centering ring 28 through a driving pin 28a engaging the gear teeth 32.

Thus, the top lands 36 of the gear teeth 32 are used as a locating datum on one end of the unfinished bevel gear member 10₃. On the other end of the unfinished bevel gear member 10₃, the centering pin 52 of the rear spindle 50 is used as a locating datum. Alternatively, a spline pitch diameter is used as a locating datum. If a spline major diameter needs to be machined at this time, as is becoming more common for reduced drive shaft runout, the shaft 15₂ is blanked in such a manner that a diameter of the rear portion 20₂ is small enough in blanking as to not require machining after heat treatment.

Figure 8:
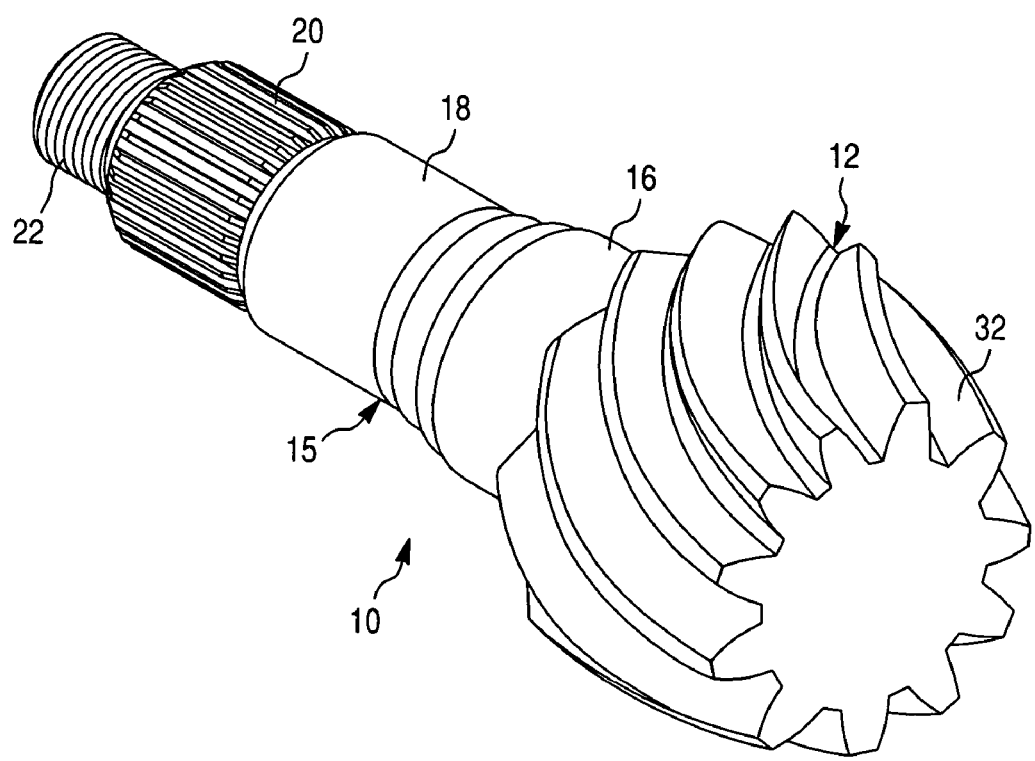
FIG. 8 is perspective view of a bevel gear member manufactured in accordance with the preferred embodiment of the present invention.

The post heat treatment machining operations form a finished product—a bevel gear member 10 illustrated in FIG. 8. Preferably, as shown in FIG. 8, the bevel gear member 10 is a pinion drive gear, such as used for final drive assemblies of vehicular drive axles. Those of ordinary skill in the art will appreciate that the method for manufacturing bevel gears of the preferred embodiment of the present invention may is applicable for manufacturing of any bevel gear member including a gearhead with any appropriate tooth profile, such as spiral, hypoid, straight, etc., and a shaft.

Figure 9:
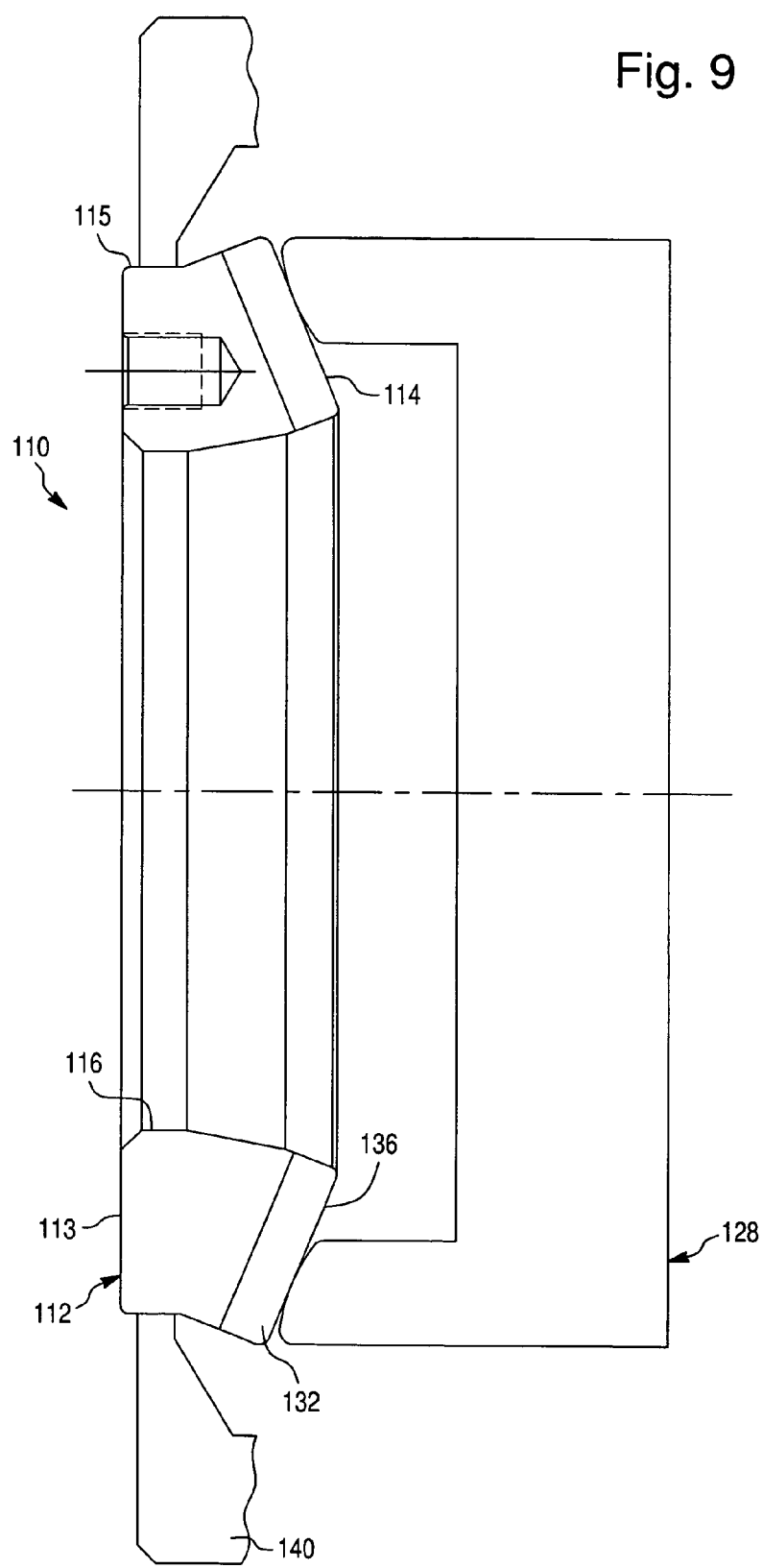
FIG. 9 is a side view of ring gear in accordance with the alternative embodiment of the present invention supported by the centering ring during a finish machining operation.

Alternatively, the method of the present invention is applicable for manufacturing shaftless gear members, such as a ring gear member 110 having a substantially annular gearhead 112. Gear teeth 132 of the gearhead 112 of the ring gear member 110 are cut with gear cutter blades provided to cut top lands 136 of the gear teeth 132 simultaneously with side profiles thereof and bottom lands using a substantially the same cutting process as in the preferred embodiment of the present invention described hereinabove. After the teeth 132 are cut, the ring gear member 110 is hardened using various common heat treatment methods. Then the post heat treatment, or final, machining operation or operations can be simplified (FIG. 9) giving similar advantages as stated for the gear member with the shaft. More specifically, during the final machining operation, as illustrated in FIG. 9, the ring gear member 110 is supported by the centering ring (or locator) 128 which rests on the top lands 136 of the gear teeth 132 (or a face angle surface 114) of the ring gear member 110 and a self-centering chuck 129 engaging an outer peripheral surface 115 of the ring gear member 110. Thus, the top lands 136 of the gear teeth 132 are used as a locating datum on one end of the ring gear member 110. In this position, an inner peripheral surface 116 and/or a rear face surface 113 of the ring gear member 110 is finish machined.

Therefore, the present invention represents a novel arrangement of the method for manufacturing bevel gears including the steps of forming gear teeth by simultaneously-cutting gear tooth top land, gear tooth side profile and a bottom land to form an unfinished bevel gear member, thus providing virtually no eccentricity between the gear tooth top lands and the gear bottom lands, and machining at least one selected surface of the unfinished bevel gear member using the top lands of the gear teeth as a datum for centering the unfinished bevel gear member. As a result, the bevel gear members manufactured in accordance with the present invention exhibit substantially reduced runout with a simpler set-up, require simpler, less expensive tooling to machine the gear surfaces, which is easier to keep aligned for eccentricity and much easier to maintain. The runout can be set so as to reduce vehicle noise levels.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for manufacturing a bevel gear member, said method comprising the steps of:
   a) providing a bevel gear blank;
   b) forming gear teeth on said bevel gear blank by simultaneously cutting gear tooth top land, gear tooth side profile and a bottom land to form an unfinished bevel gear member; and
   c) machining at least one selected surface of said unfinished bevel gear member using said top lands of said gear teeth as a datum for centering said unfinished bevel gear member.

2. The method for manufacturing the bevel gear member as defined in claim 1, wherein said bevel gear blank is a single-piece, unitary workpiece.

3. The method for manufacturing the bevel gear member as defined in claim 2, wherein said unitary workpiece is formed by one of a forging and casting process.

4. The method for manufacturing a bevel gear member as defined in claim 1, wherein said bevel gear blank has a gearhead and a shaft coaxially extending from said gearhead.

5. The method for manufacturing the bevel gear member as defined in claim 4, wherein the step of providing said bevel gear blank includes the steps of:

forming a bevel gear workpiece having said gearhead and said shaft;

forming said bevel gear blank by machining said shaft of said workpiece using a face angle surface of said gearhead of said workpiece as a locating surface for centering of said workpiece.

6. The method for manufacturing the bevel gear member as defined in claim 5, wherein said bevel gear workpiece is formed by one of a forging and casting process.

7. The method for manufacturing the bevel gear member as defined in claim 1, wherein said bevel gear member is a pinion gear member including a gearhead and a shaft having a first bearing seat portion and a second bearing seat portion, and wherein the step of machining at least one selected surface of said unfinished bevel gear member includes the step of machining at least one of said first bearing seat portion and said second bearing seat portion of said pinion gear member.

8. The method for manufacturing the bevel gear member as defined in claim 1, wherein said bevel gear member is a ring gear member having an inner peripheral surface and a rear face surface, and wherein the step of machining at least one selected surface of said unfinished bevel gear member includes the steps of machining at least one of said inner peripheral surface and said rear face surface of said ring gear member.

9. The method for manufacturing the bevel gear member as defined in claim 1, further including the step of hardening said bevel gear member using a heat treating process subsequent to the step (b) of forming gear teeth and prior to the step of (c) of machining at least one selected surface of said unfinished bevel gear member.

10. The method for manufacturing the bevel gear member as defined in claim 1, wherein the step (b) of forming gear teeth is a face hobbing process.

11. The method for manufacturing the bevel gear member as defined in claim 1, wherein the step (b) of forming gear teeth uses gear cutter blades each including a shank and a cutting member having a cutting edge having a first section extending from a distal end of said shank at a given axial pressure angle and dimensioned to cut at least one of side profiles of said gear teeth of said bevel gear blank, and a second section substantially perpendicular to a central axis of said cutter blade and dimensioned to cut at least a substantial portion of a top land of said gear teeth so that each of said gear cutter blades forms at least a substantial portion of said top land of said teeth of said bevel gear member simultaneously with said side profile thereof.

* * * * *